Patented Sept. 13, 1932

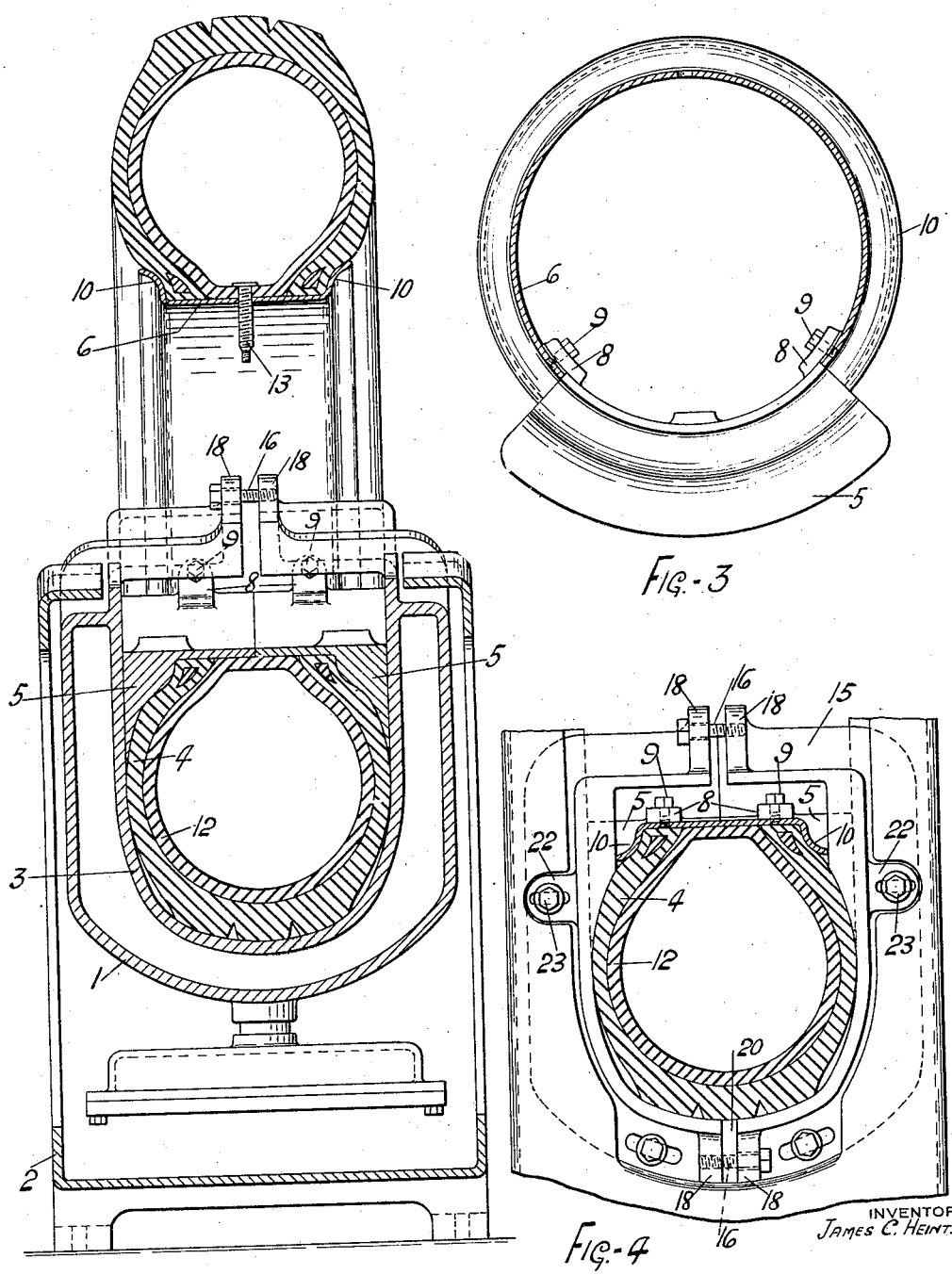

1,877,175

UNITED STATES PATENT OFFICE

JAMES C. HEINTZ, OF LAKEWOOD, OHIO

SECTIONAL TIRE REPAIR VULCANIZER

Application filed May 19, 1930. Serial No. 453,641.

The present invention relates to improvements in tire repair vulcanizers and particularly to vulcanizers of the sectional repair type, and also to improved methods of making segmental repairs.

The repair vulcanizer shown and described herein is particularly and especially designed for the repair of large pneumatic tires, which are of large cross-section and small bead diameters, and is for the purpose of making external repairs with internal fluid pressure within the tire. In the making of such repairs, it has been customary heretofore to use sectional air bags, but these bags are expensive and difficult to handle, it being practically impossible on very large pneumatic tires to insert and remove the usual form of sectional air bag.

While the invention has as its object the designing of sectional repair equipment for very large pneumatic tires, for the reasons set forth, it is not necessarily limited to that use, but the principles thereof may be extended for all sizes of tires.

It is also an object of the invention to provide improved means and methods for preventing the marks on the tire at the ends of the segmental repair.

The invention is subject to modifications and improvements, it being understood that the detailed description of the invention is not to be taken as limiting the invention, but merely for the purpose of explaining the same to those skilled in this art.

In the drawings:

Figure 2 is a cross-section thereof on the line 2—2 of Figure 1;

Figure 3 is a view showing the sectional rim removed from the device; and

Figure 4 is a section on the line 4—4 of Figure 1.

Figure 1:
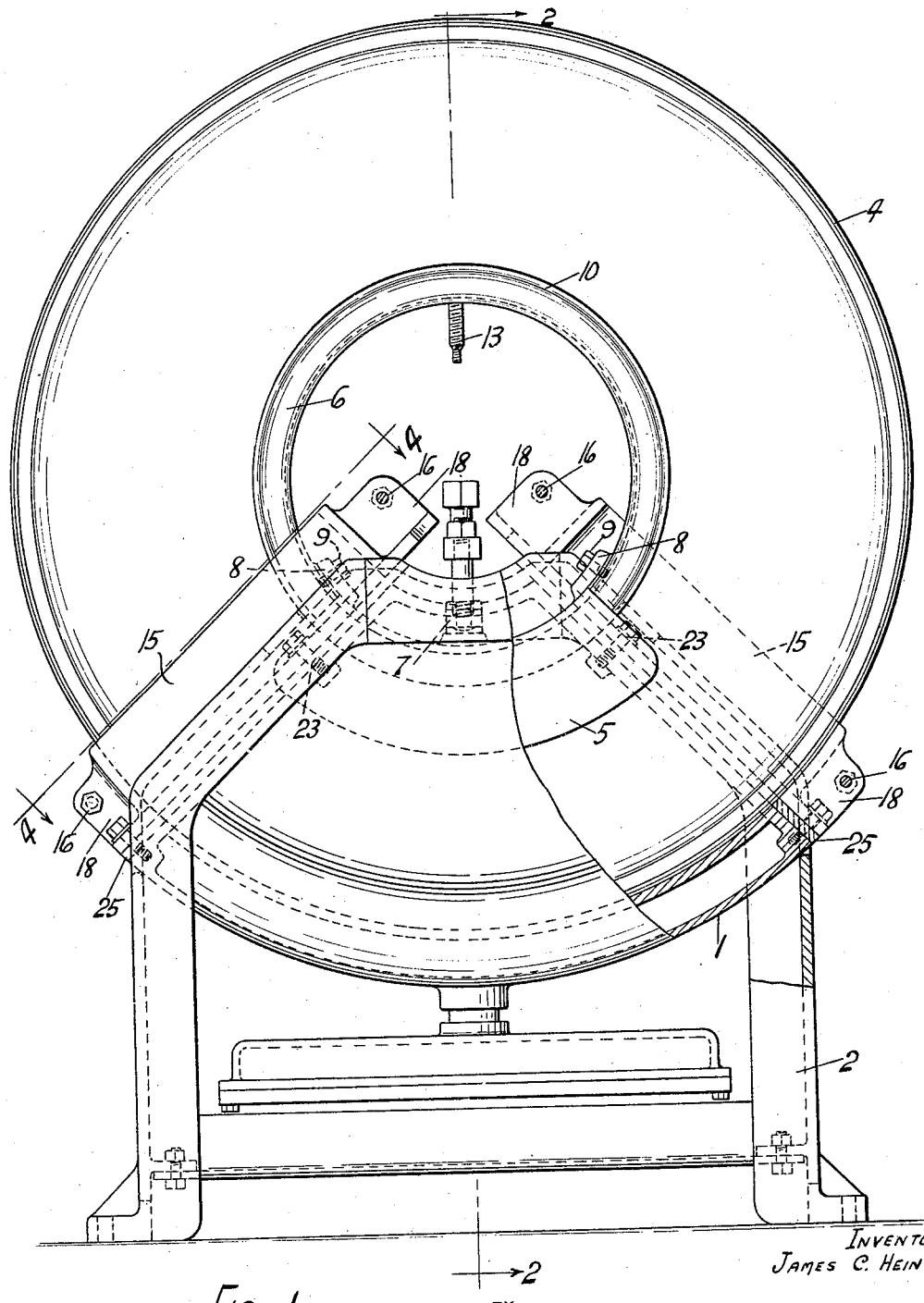
Figure 1 is a side elevation of a repair vulcanizer embodying the principles of the invention.

The repair vulcanizer of the present invention comprises a sectional chambered arc-shaped vulcanizer or mold 1 which is supported upon uprights 2 and is heated by the circulation of steam through the chamber. The interior of the cavity 3 is shaped to fit the exterior of the tire in the usual manner, and may be provided with non-skid formations if desired. The sides of the cavity extend tangentially of the tire.

The bead portions of the tire are enclosed by the usual bead plate 5 which as shown herein, is in two parts, although a one piece plate may be employed. The plate or plates extend to the limits of the vulcanizer cavity and complete the enclosure of the tire, these flanges extending to the median line of the tire. A suitable clamp 7 may be employed to retain the tire within the mold, exerting the requisite pressure upon the bead plate.

The major portion of the tire 4 is seated within a sectional rim 6, which extends completely about the beads of the tire except at those portions occupied by the flanges, the latter being attached to the ends of the rim by means of lugs 8 which project over the rim and are attached thereto by bolts 9. The rim segment is provided with the usual flanges 10. In assembling the tire within the rim the bead plates are first removed which permits the rim to be inserted within the beads of the tire, the rim being flexed, if necessary, for this purpose. An inner air tube 12 of the usual form, or slightly heavier, if desired, is placed within the tire during the assembling operation, the tube being provided with the usual inflating valve 13, and being designed to operate as an air bag to secure the requisite internal pressure.

In order to prevent the formation of objectionable marks at the ends of the heated vulcanizer cavity, extensions are employed, which are mounted upon the ends of the cavity mold. These extensions are in the form of a yoke and preferably adjustable and enclose the tire, being mounted in position after the tire is located in the cavity. Each extension comprises a pair of oppositely positioned U-shaped clamps 15 which are adjustably connected above and below the tire by bolts 16 which pass through lugs 18 formed on the clamps. In order to adjust the size of the clamps, removable blocks 20 may be placed between the ends thereof. The clamps are adjustably secured to the cavity mold by means of lugs 22 which are slotted to receive bolts 23 entering the ends of the cavity mold. If desired insulator plates 25 are located between the ends of the cavity mold and the clamps. These extensions or clamps are designed not only to form cold extensions for the vulcanizer cavity, but by exerting sufficient pressure through the adjusting means will press the tire inwardly slightly at the ends of the cavity and by spacing the tire at these points prevent the formation of the objectionable ridges where the heated cavity and bead plates terminate.

It will be observed that the combination of the sectional bead plates and the rim permits the use of a full-circle air bag or tube in a sectional repair. This is a decided advantage in the repair of large tires, the full-circle tubes providing the necessary internal pressure without the use of a sectional air bag. The apparatus is easily assembled with the tire and is very efficient for the purposes specified. Being a new and novel form of sectional repair apparatus is entitled to a liberal range of equivalents. Insofar as known to me, it is the first sectional repair equipment using a full circle air bag, or tube. The apparatus is less expensive than other forms of sectional repair equipment for the repair of large tires. It has other advantages as will be apparent to those skilled in the art.

What is claimed is:

1. A tire repair equipment comprising a flexible flanged rim, having a gap therein bead plates attached to the ends of the rim and completing the full annular seat for the tire, an air container within the tire, and a sectional cavity mold located at the bead plates.

2. Tire repair equipment comprising a rim having flanges to engage the beads of the tire, sectional bead curing plates detachably secured to the rim and contacting with the lower portion of the tire in the repair zone, and a sectional cavity vulcanizer to receive the bead plates.

3. Tire repair equipment comprising a full circular seat for the beads of the tire, a sectional cavity vulcanizer located at one point about the tire, a full circle expansible air bag within the tire and means associated with the vulcanizer engaging the tire adjacent the beads for holding the tire in the vulcanizer.

4. Tire repair equipment comprising a full circular seat for the beads of the tire, said seat comprising a rim and a bead plate secured to the rim and having flanges extending to the median line of the tire, and a sectional cavity vulcanizer to receive the bead plate.

5. Tire repair equipment comprising a full circular seat for the beads of the tire, said seat comprising a rim and a bead plate secured to the rim and having flanges extending to the median line of the tire, a full circle expansible tube within the tire, and a sectional cavity vulcanizer to receive the bead plate.

6. Tire repair equipment comprising a flanged tire carrying rim, a segmental bead plate detachably secured thereto, said bead plate having flanges extending to the median line of the tire, and an expansible core within the tire.

7. Tire repair equipment comprising a flanged tire carrying rim, a segmental bead plate detachably secured thereto, said bead plate having flanges extending to the median line of the tire, and a core within the tire.

8. Tire repair equipment comprising a flanged tire carrying rim, a segmental bead plate detachably secured thereto, said bead plate having flanges extending to the median line of the tire, and a full circle tube within the tire.

9. Tire repair equipment comprising a flanged tire carrying rim, a segmental bead plate detachably secured thereto, said bead plate having flanges extending to the median line of the tire, an expansible core within the tire, and a heated cavity vulcanizer located exteriorly of the tire at the bead plate.

10. Tire repair equipment comprising a flanged tire carrying rim, a segmental bead plate detachably secured thereto, said bead plate having flanges extending to the median line of the tire, a core within the tire, and a heated cavity vulcanizer located exteriorly of the tire at the bead plate.

11. Tire repair equipment comprising a flanged tire carrying rim, a segmental bead plate detachably secured thereto, said bead plate having flanges extending to the median line of the tire, a full circle tube within the tire, and a heated cavity vulcanizer located exteriorly of the tire at the bead plate.

12. In a tire repair equipment a flanged rim to seat the major circumference of the tire, having a gap therein, and a bead plate having flanges adapted to extend to the median line of the tire, located in said gap and removable therefrom to permit the seating of the tire within the rim.

13. In a tire repair equipment a flanged rim to seat the major circumference of the tire, having a gap therein, a bead plate having flanges adapted to extend to the median line of the tire, located in said gap and removable therefrom to permit the seating of the tire within the rim, and a vulcanizer located exteriorly of the tire at the bead plate.

14. A sectional cavity mold, a bead plate located therein and having bead flanges extending to the median line of the tire and an expansible yoke attached to the end of the mold and adapted to form a cold extension thereof.

15. A sectional cavity mold, a pair of oppositely facing clamps forming a yoke about the tire at the end of the mold, and means to draw the clamps together to exert pressure upon the tire.

16. A sectional cavity mold, and a contractible yoke in contact with the tire adjacent the end of the mold.

17. A tire repair device comprising a full circular seat for the bead portions of the tire, a sectional cavity vulcanizer to receive a portion of the tire, an annular tube within the tire, and expansible yokes adjustably secured to the ends of the vulcanizer to form extensions on the opposite ends of the vulcanizer.

18. A tire repair device comprising a full circular seat for the bead portions of the tire, a sectional cavity vulcanizer to receive a portion of the tire, an expansible core within the tire, and expansible yokes adjustably secured to the ends of the vulcanizer to form extensions on the opposite ends of the vulcanizer.

19. Tire repair equipment comprising a flanged tire carrying rim, a segmental bead plate detachably secured thereto, a sectional cavity vulcanizer to receive a portion of the tire, an annular tube within the tire, and cold extensions on the opposite ends of the vulcanizer.

20. Tire repair equipment comprising a flanged tire carrying rim, a segmental bead plate detachably secured thereto, a sectional cavity vulcanizer to receive a portion of the tire, an expansible core within the tire, and cold extensions on the opposite ends of the vulcanizer.

JAMES C. HEINTZ.